(No Model.) 2 Sheets—Sheet 1.
J. F. FIGGE.
COMBINED PULVERIZER, ROLLER, AND STALK CUTTER.
No. 539,615. Patented May 21, 1895.
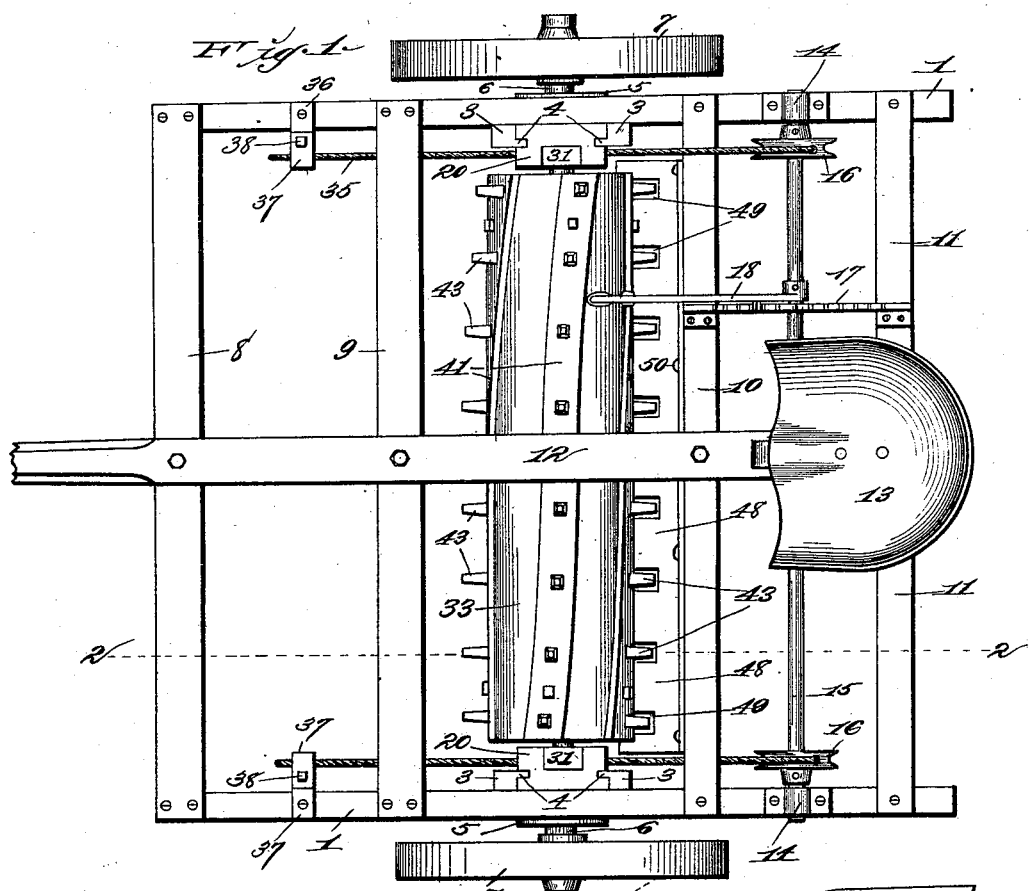
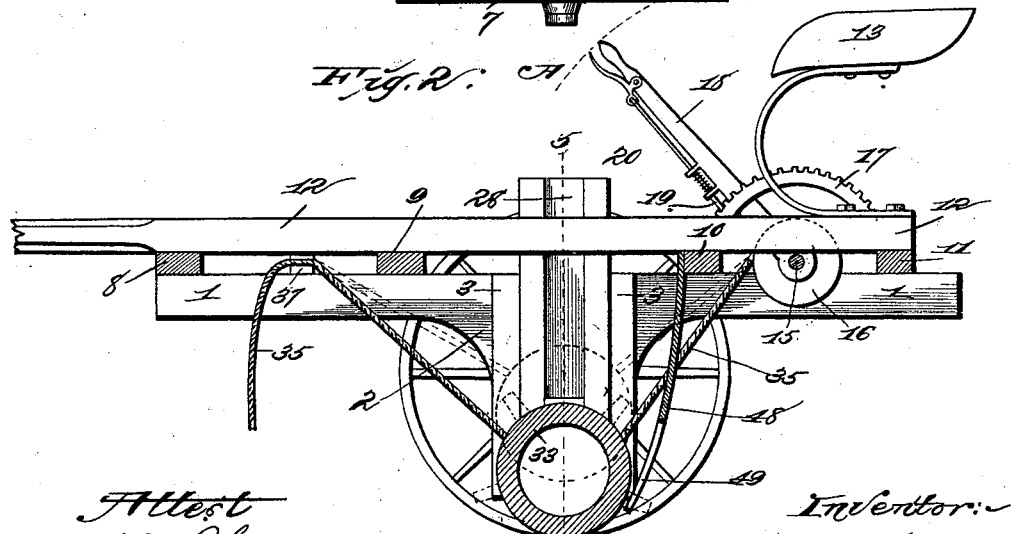

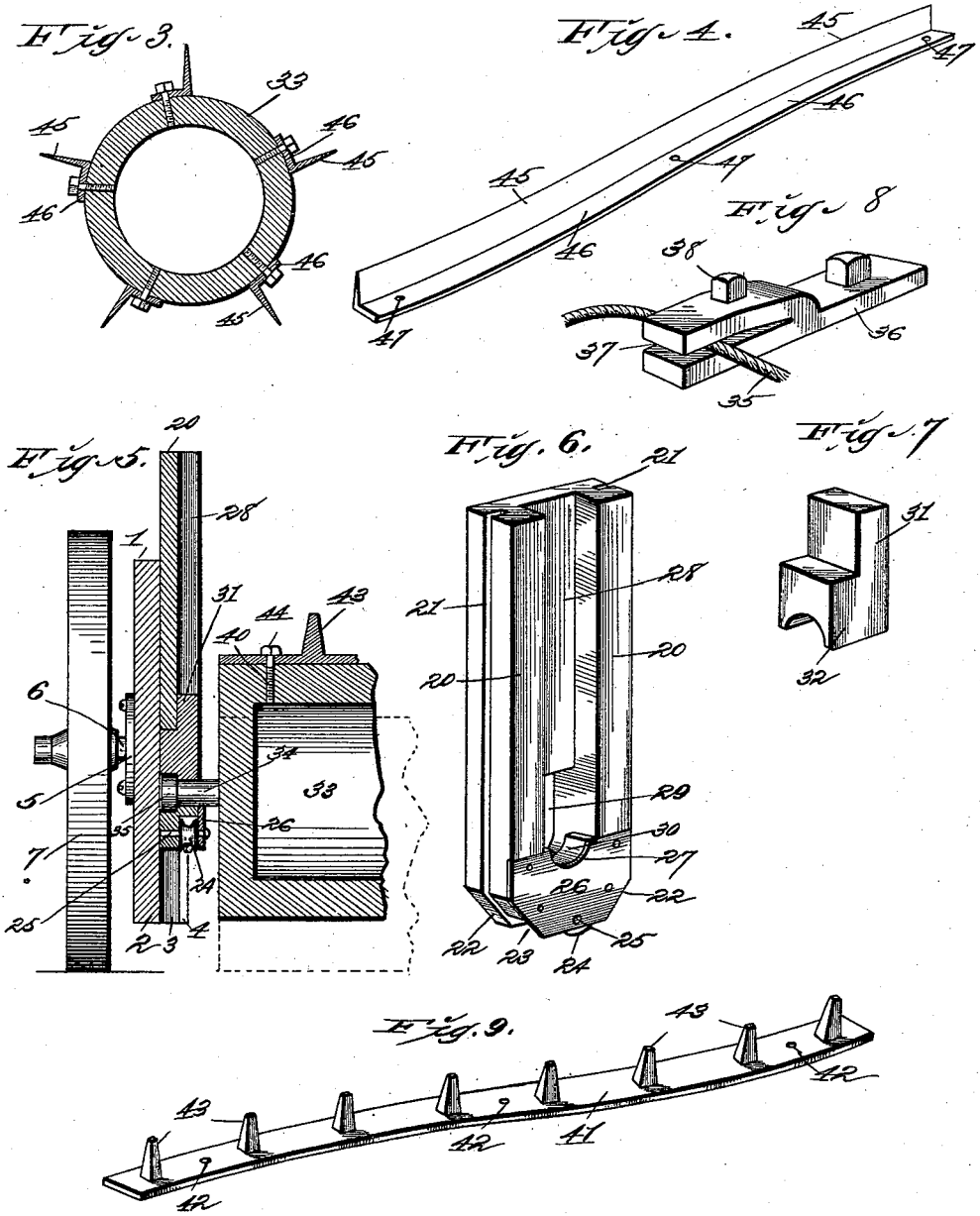

UNITED STATES PATENT OFFICE.

JOHN F. FIGGE, OF ALHAMBRA, ILLINOIS.

COMBINED PULVERIZER, ROLLER, AND STALK-CUTTER.

SPECIFICATION forming part of Letters Patent No. 539,615, dated May 21, 1895.

Application filed December 17, 1894. Serial No. 532,023. (No model.)

*To all whom it may concern:*

Be it known that I, JOHN F. FIGGE, of the city of Alhambra, Madison county, State of Illinois, have invented certain new and useful Improvements in a Combined Pulverizer, Roller, and Stalk-Cutter, of which the following is a full, clear, and exact description, reference being had to the accompanying drawings, forming a part hereof.

My invention relates to an improved combined pulverizer, roller and stalk-cutter, and consists in the novel construction, combination and arrangement of parts, hereinafter described and claimed.

The object of my invention is to mount a land roller in a frame carried by wheels and to provide removable attachments for said land roller, thereby transforming said land roller into either an earth pulverizer or stalk cutter.

A further object of my invention is to construct a combined earth pulverizer, roller and stalk-cutter that is inexpensive in manufacture and possesses superior advantages in point of simplicity, durability and general efficiency.

In the drawings, Figure 1 is a top plan view of my improved wheeled earth-pulverizer, roller, and stalk-cutter. Fig. 2 is a longitudinal sectional view, the same being taken approximately on the indicated line 2 2 of Fig. 1. Fig. 3 is a cross-sectional view of the land-roller of which I make use, the same having positioned thereon a series of stalk-cutting knives. Fig. 4 is a view in perspective of one of the stalk-cutting knives. Fig. 5 is a vertical sectional view taken on the indicated line 5 5 of Fig. 2. Fig. 6 is a view in perspective of a vertically-moving bearing-block of which I make use in carrying out my invention. Fig. 7 is a view in perspective of a metallic bearing that is positioned within and carried by the vertically-moving bearing. Fig. 8 is a view in perspective of a cable-clamp used in carrying out my invention. Fig. 9 is a view in perspective of one of the removable attachments to be positioned upon the land-roller when it is desired to use said roller as an earth-pulverizer.

Referring by numerals to the accompanying drawings, 1, 1 indicate the side timbers of the main frame work, the same constructed with downwardly pending portions 2, to the insides of which are rigidly fixed parallel vertical guide-bars 3, said guide-bars being in turn provided with tongues 4. Securely bolted to the outside faces of the downwardly pending portions 2 of the side timbers 1 are plates 5 from which project stub-axles 6, upon which are mounted ordinary traction-wheels 7. Transversely positioned upon and securely bolted to the side timbers 1 are cross-timbers 8, 9, 10 and 11. Extending longitudinally of the frame work thus constructed, parallel with the side timbers 1, 1 and rigidly bolted to the transverse timbers 8, 9, 10 and 11, is a timber 12, the forward end of which projects beyond the transverse timber 8 and forms the tongue of my device. Mounted upon the rear end of this tongue 12 in the usual manner is a driver's seat 13.

Extending transversely of the rear end of the device and having its ends mounted in journal-bearings 14 bolted to the top sides of the side-timbers 1, 1, is a shaft 15 upon which and adjacent the journal-bearings 14 are rigidly fixed grooved-wheels 16. A segmental toothed-rack 17 is rigidly mounted upon the transverse timbers 10 and 11 and to the right-hand side of the tongue-timber 12.

Rigidly mounted upon the shaft 15 is a hand-lever 18, the lower end of the spring-actuated pawl 19 of which engages between the teeth of the segmental rack 17.

Vertically moving bearings 20 are provided in their sides with grooves 21 and are so positioned relative the side timbers 1, 1 and the guide-bars 3 as that the tongues 4 on said guide-bars 3 will engage in the grooves 21. Thus said bearings 20 are mounted for vertical movement upon the inside faces of the side-timbers 1, 1 and the downwardly pending portions 2 thereof. The construction of these bearings 20 being identical, the following description will be limited to one of the same: The lower end corners 22 of this bearing 20 are rounded or beveled and a recess 23 formed in the lower front end of the bearing 20, said recess being for the reception of a grooved-wheel or pulley 24 that is mounted for rotation upon the shaft 25 that passes through the rear lower end of the bearing 20 and through the lower end of a metallic plate 26 that is rigidly fixed to the lower end and forward face of said bearing. In the upper edge of this plate 26 is a semi-circular cutaway portion 27. Extending from the top edge of the plate 26 to the top of the bearing 20 is a rectangular groove 28. The lower end of this groove 28 communicates with a passage 29 through the lower end of the bearing 20, the lower portion of which is formed into a semi-circular bearing 30, the same having two different diameters. Adapted to be located in the lower end of the vertical groove 28 is a rectangular bearing-block 31, the same being provided with an integral extension 32 that is located in the passage 29 through the lower end of the bearing 20. The under side of the block 31 is formed into a semi-circular bearing surface of a diameter equal to the diameter of the semi-circular bearing surface of that portion of the bearing 30 that is adjacent the semi-circular cutaway portion 27 of the plate 26. The under side of the integral portion 32 of the bearing-block is formed into a semi-circular bearing of a diameter corresponding to that of the semi-circular bearing formed in the rear of the semi-circular bearing 30 previously mentioned.

A cylinder 33 forming the land roller of my device is provided with integral stub-shafts 34, the same being provided with heads 35 on their outer ends. These stub-shafts 34 with their heads 35 are located in the bearings formed by the semi-circular faces 30 and the semi-circular faces of the under sides of the bearing-blocks 31 and their integral extensions 32.

Bolted to the top sides of the side-timbers 1, 1 and near the front ends thereof are cable-clamps 36, the forward ends of which are split or bifurcated as indicated by 37. A screw-bolt 38 passes vertically through the split or bifurcated portion of this clamp.

Wire-ropes or cables 39 have their rear ends fixed to the grooved-wheels or pulleys 16 and pass from thence forwardly and downwardly beneath the grooved-wheels or pulleys 24 and from thence to the clamps 36. The forward ends of said cables are positioned within the split or bifurcated end 37 of said clamp and securely held therein by means of the screw-bolt 38 being so manipulated as to draw the two parts of the bifurcated end together.

Screw-threaded apertures 40 are formed at equal distances apart longitudinally and circumferentially in the roller 33.

When the device is to be used as an earth pulverizer, flat bars 41 provided with apertures or bolt-holes 42 and integral tapering lugs 43 are adapted to be mounted upon the roller 33 by means of screw-bolts 44 passing through the registering apertures 40 and 42. These bars 41 are bent to conform with the periphery of the roller 33 and by reason of the bolt-holes 40 in said roller being arranged in parallel spiral lines, said bars will necessarily be located in parallel spiral alignment. Cutting knives 45 are provided with right angle flanges 46, said flanges being provided with bolt holes 47. These cutting knives 45 are so formed and the bolt-holes 47 so located therein as that when they are properly positioned upon the periphery of the roller 33 they will occupy identically the same position occupied by the bars 41.

A cleaning attachment 48 comprises a plate, in the lower edge of which is formed a series of rectangular notches 49 through which the projecting lugs 43 of the bars 41 pass when the device is being used as an earth pulverizer. When the device is used as a stalk-cutter, this cleaner must necessarily be removed. Said cleaner is fixed to the forward side of the transversely positioned timber 10 by means of screws or bolts 50.

The operation is as follows: When the device is being moved from one point to another, where it is being turned around at the side of a field, or at any time when it is not desired to allow the roller 33 to engage with the surface of the ground, the operator manually throws the hand-lever 18 rearwardly as indicated by the arrow A, Fig. 2, thus rotating the shaft 15, said hand-lever 18 being rigidly mounted upon said shaft. The grooved-wheels 16 being rigidly fixed upon said shaft, will necessarily be partially rotated, and the rear ends of the cables 39 fixed to said pulleys will be partially wound thereon. This movement necessarily draws the lowermost portion of the cable 39 engaging the pulley 24 in the lower end of the bearing 20 upwardly, thus causing said bearing 20 and the roller 33 to leave the surface of the ground and assume the position as shown by dotted lines in Fig. 2. The roller 33 and frame work are now carried entirely by the traction-wheels 7. When it is desired to lower the roller 33 and bring the same into contact with the surface of the ground, the operator releases the pawl 19 of the hand-lever and the weight of the roller 33 will cause the same to gravitate downwardly and rest directly upon the ground.

When the device is to be used as an earth pulverizer, the bars 41 are positioned upon the periphery of the roller and the cleaner 48 bolted to the transverse timber 10 in such a manner as that the lugs 43 will pass through the rectangular notches 49 formed in the lower edge of said cleaner.

When it is desired to use the device as a stalk-cutter, the bars 41 are removed and the cutting knives 45 placed in the positions formerly occupied by the bars 41.

Thus will be seen how I have constructed a combined wheeled earth pulverizer, roller and stalk-cutter that is extremely simple in construction and operation, and the roller of which may be expeditiously transformed into either an earth pulverizer or stalk-cutter by the addition of certain attachments.

What I claim is—

An improved land roller, earth pulverizer, and stalk-cutter, comprising a rectangular frame-work mounted upon traction-wheels, parallel guide-bars fixed to the inner sides of the side-timbers of said frame-work, bearings arranged to slide vertically in said guide-bars, bearing-blocks carried by the lower ends of the vertically moving bearings, a roller provided with stub-axles journaled beneath the bearing-block in the lower end of the bearing, cables fixed to the forward portion of the frame-work and passing beneath the vertically moving bearings, grooved-wheels mounted upon a shaft journaled in bearings fixed upon the rear end of the machine, and a hand-lever fixed to said shaft, said hand-lever, shaft, grooved-wheels and cables forming means for vertically moving the roller and bearings thereof.

In testimony whereof I affix my signature in presence of two witnesses.

JOHN F. FIGGE.

Witnesses:
M. G. IRION,
JNO. G. HIGDON.